US007293263B2

(12) United States Patent
Dahlstedt et al.

(10) Patent No.: US 7,293,263 B2
(45) Date of Patent: Nov. 6, 2007

(54) SYSTEM AND METHOD FOR MEMORY LEAK DETECTION IN A VIRTUAL MACHINE ENVIRONMENT

(75) Inventors: Joakim Dahlstedt, Stockholm (SE); Peter Lonnebring, Stockholm (SE); Mikael Vidstedt, Stockholm (SE)

(73) Assignee: BEA Systems, Inc., San Jose, CA (US)

( * ) Notice: Subject to any disclaimer, the term of this patent is extended or adjusted under 35 U.S.C. 154(b) by 676 days.

(21) Appl. No.: 10/737,404

(22) Filed: Dec. 16, 2003

(65) Prior Publication Data
US 2004/0133895 A1    Jul. 8, 2004

Related U.S. Application Data

(60) Provisional application No. 60/435,487, filed on Dec. 20, 2002.

(51) Int. Cl.
  *G06F 9/45*     (2006.01)
  *G06F 9/44*     (2006.01)
  *G06F 17/30*    (2006.01)
(52) U.S. Cl. ............... 717/154; 717/128; 707/206
(58) Field of Classification Search ........... 717/128; 707/206
  See application file for complete search history.

(56) References Cited

U.S. PATENT DOCUMENTS

| 6,560,773 | B1 * | 5/2003 | Alexander et al. | 717/128 |
| 6,658,652 | B1 * | 12/2003 | Alexander et al. | 717/128 |
| 6,728,738 | B2 * | 4/2004 | Wolczko et al. | 707/206 |
| 6,795,836 | B2 * | 9/2004 | Arnold et al. | 707/206 |
| 7,035,884 | B2 * | 4/2006 | Garthwaite | 707/206 |
| 2003/0163661 | A1 * | 8/2003 | Marion et al. | 711/170 |
| 2004/0078540 | A1 * | 4/2004 | Cirne et al. | 711/170 |

OTHER PUBLICATIONS

M. Schelvis, "Incremental distribution of timestamp packets: a new approach to distributed garbage collection", Sep. 1989 ACM SIGPLAN Notices, Conference proceedings on Object-oriented programming systems, languages and applications OOPSLA '89, vol. 24 Issue 10, pp. 37-48.*
Laurent Amsaleg, Michael J. Franklin, Olivier Gruber, "Garbage collection for a client-server persistent object store", Aug. 1999, ACM Transactions on Computer Systems (TOCS), vol. 17 Issue 3, pp. 153-201.*
Sung-Wook Ryu, B. Clifford Neuman, "Garbage Collection for Distributed Persistent Objects", posted 1997, retrieved from http://www.objs.com/workshops/ws9801/papers/paper015.html.*

* cited by examiner

*Primary Examiner*—Wei Zhen
*Assistant Examiner*—Philip Wang
(74) *Attorney, Agent, or Firm*—Fliesler Meyer LLP

(57) ABSTRACT

A system and method for detecting memory leaks in a garbage collected environment. In particular, the present invention provides a mechanism by which objects in the memory space of a virtual machine are analyzed as to whether they are warm or cold, i.e., how long they have persisted in memory without being accessed or referenced by another object. Following this analysis, the objects are clustered into groups of warm or cold objects, and any links from warm clusters to cold clusters are determined. This information is then provided to the software developer for use in detecting and analyzing potential memory leaks.

75 Claims, 5 Drawing Sheets

SYSTEM AND METHOD FOR MEMORY LEAK DETECTION IN A VIRTUAL MACHINE ENVIRONMENT

CLAIM OF PRIORITY

This application claims the benefit of U.S. Provisional Application "SYSTEM AND METHOD FOR MEMORY LEAK DETECTION IN A VIRTUAL MACHINE ENVIRONMENT", Ser. No. 60/435,487; filed Dec. 20, 2002, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to virtual machine and run-time environments, and particularly to a system and method for detecting memory leaks in a garbage collected environment.

BACKGROUND OF THE INVENTION

In an application server or run-time environment which includes a virtual machine, for example the Java Virtual Machine from Sun Microsystems or the JRockit Virtual Machine from Bea Systems, Inc., resources are constantly being created and used to service client and server requests. The typical virtual machine (VM) environment exists on a server that includes an operating system and memory space. As the VM executes, servicing client requests and running applications, it creates object instances in the memory of the VM or server. As the system operates this memory space is continuously used up with new objects and other resources. The typical VM environment includes a garbage collection mechanism that is used to clean up the memory space and to remove those resources that are no longer needed. Most common garbage collection methods operate on the basis of automatically freeing up resources that are no longer used, i.e., that include objects which are no longer referred to by other objects. However, a common problem with all existing garbage collection mechanisms is that of memory leakage. During the development of a typical software application, objects may be specified by the developer that may unknowingly point to other objects. During run-time, this object may then point to another object which is no longer needed. If an object that is no longer needed and yet still exists in memory space because of such invalid requests or pointers, this is considered a memory leak and is undesirable. Because the object is never freed up, the memory space it occupies cannot be used by other resources. This is a particular problem when objects are continuously created during run-time but are never freed up, so that eventually the entire memory space of the virtual machine fills up and the machine or computer typically needs to be restarted.

The traditional approach to detecting and analyzing potential memory leaks during the software development process is to create an object display object map for the developer that illustrates all of the preferred objects in the memory space, and then highlights or otherwise displays to the developer those objects that may represent potential memory leaks. The problem with this method is that it only gives a high level view of the object map, and provides very little useful information to the developer to accurately determine large scale memory leaks and find the responsible object or objects. Since the vast number of objects represented on the display tend to overwhelm the important information, i.e., which objects are prone to creating memory leaks, it is doubtful that this large scale object display is of much use to the developer.

Besides this traditional method of creating object maps, little else has been done in the software development field for creating tools that allow a virtual machine application developer to accurately access their application for potential memory leaks. Any new technique that would assist the developer in detecting such memory leaks would provide a significant advantage to the software developer, and would result in cleaner applications that minimize the need to restart the virtual machine on such a regular basis.

SUMMARY OF THE INVENTION

The invention provides a system and method for detecting memory leaks in a garbage collected environment. In particular, the invention provides a mechanism by which objects in the memory space of a virtual machine are analyzed as to whether they are "warm" or "cold", i.e., how long they have persisted in memory without being accessed or referenced by another object. Following this analysis, the objects are clustered into groups or clusters of warm or cold objects, and any links from warm clusters to cold clusters are determined. This information is then provided to the software developer for use in detecting and analyzing potential memory leaks.

In accordance with one embodiment, the invention comprises a system for determining potential memory leaks in a run-time environment, said run-time environment including a virtual machine and a memory space for storing objects, comprising: an object temperature analyzer that determines the status of warm objects and cold objects in said memory, and the links between said warm and cold objects; and, a report mechanism that reports information about said links, for use in determining potential memory leaks.

In accordance with another embodiment, the invention comprises a method for use in determining potential memory leaks in a run-time environment, said run-time environment including a virtual machine and a memory space for storing objects, comprising: creating objects in the memory of a run-time environment; stamping each object with a time stamp when created; updating the time stamp as each object is accessed or referenced; after a time $T_{check}$ marking each object as being either warm or cold; clustering warm objects together to form warm clusters and cold objects together to form cold clusters; and, displaying an object map showing links between warm clusters and cold clusters.

Additional embodiments are described herein. The above examples are not intended to be exhaustive or to limit the invention to the precise forms disclosed. It is intended that the scope of the invention be defined by the following claims and their equivalence.

DETAILED DESCRIPTION

As described herein, an embodiment of the present invention provides a system and method for detecting memory leaks in a garbage collected environment. In particular, the invention provides a mechanism by which objects in the memory space of a virtual machine are analyzed as to whether they are "warm" or "cold", i.e., how long they have persisted in memory without being accessed or referenced by another object. Following this analysis, the objects are clustered into groups or clusters of warm or cold objects, and any links from warm clusters to cold clusters are determined. This information is then provided to the software developer for use in detecting and analyzing potential memory leaks.

Figure 1:
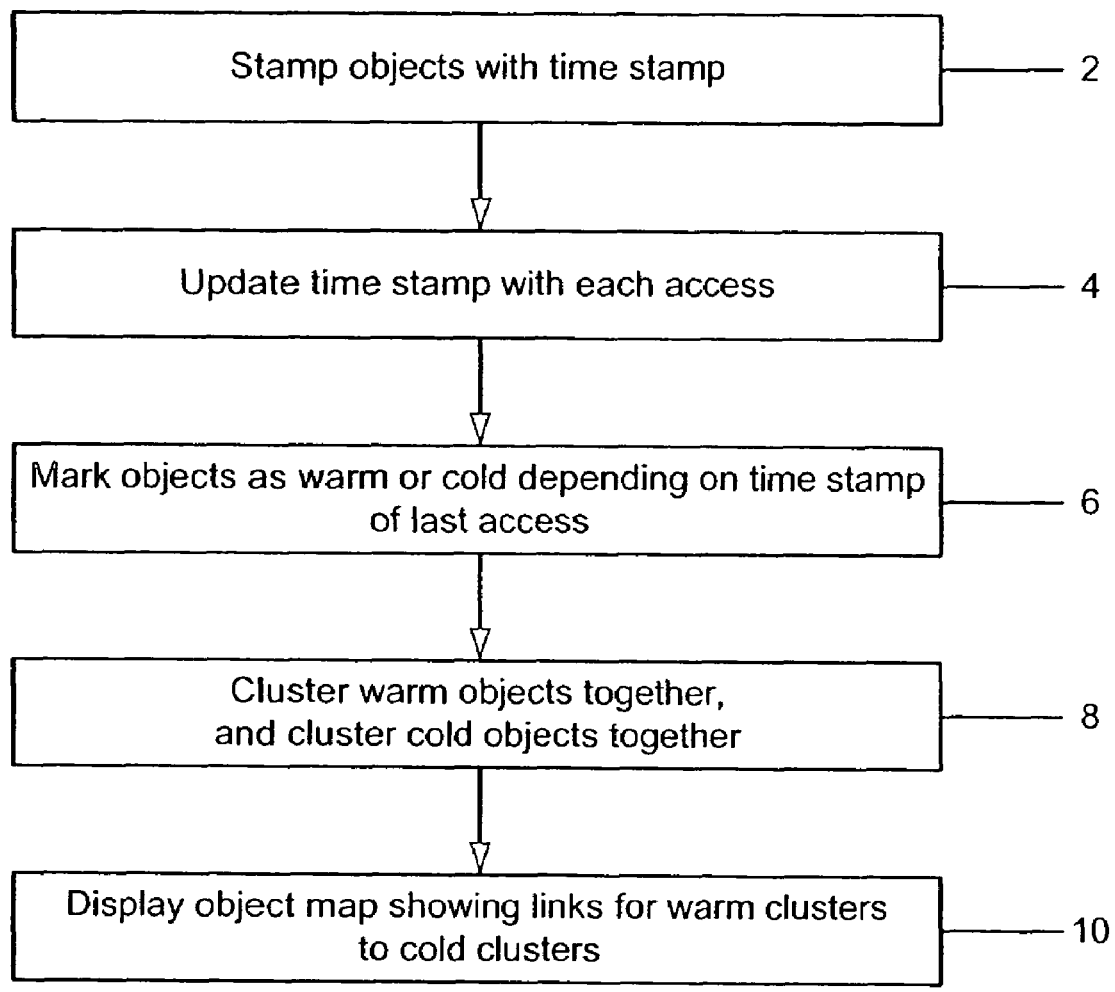
FIG. 1 shows a flowchart of a method in accordance with an embodiment of the invention that can be used to display an object map.

FIG. 1 shows a flowchart of a process in accordance with an embodiment of the invention. As shown in FIG. 1, the process begins in step 2 with stamping each object with a time stamp. This can only be done in a virtual machine environment, since that is where the objects are placed into memory. In accordance with this embodiment of the invention each object header must include an extra field that is used to represent the time stamp. In step 4, every time the object is accessed i.e., referenced by another object, the time stamp within the header for that object is updated with the new time stamp information. In step 6, after a particular time, all of the objects are analyzed for potential memory leaks. Objects that have been accessed within some reasonable measure of time are marked as "warm" objects, while objects that have not been accessed within that time frame are marked as "cold" objects. It will be evident that the length of time used to determine whether an object should be marked as being warm or cold may be varied to suit the particular implementation, system environment, or needs of the developer. Embodiments of the invention may include controls for allowing the developer to fine tune the distinction between warm and cold objects. In step 8, all of the warm objects which are pointing to each other are clustered together in a warm cluster, and similarly all of the cold objects that are pointing together are clustered together to form a cold cluster. This clustering mechanism greatly assists the software developer in detecting potential memory leaks. Whereas in the traditional methods, objects are checked for memory leaks simply on the basis of each object, the feature of the present invention in being able to cluster cold objects and warm objects together allows the developer to focus on those leaks that are more substantial. In step 10, an object map is displayed graphically showing the programmer software developer the links between the cold clusters and the warm clusters, and also informing the developer which particular field in which particular warm object is referencing the cold cluster. This gives the developer a powerful graphical view of their object memory usage, and allows them to focus on those objects that present the most potential for memory leak.

In some embodiments, the number of clusters can be reduced by displaying to the developer only those clusters that occupy more than a particular amount of memory space, e.g. x bytes of memory. The actual implementation details of this may vary, and may be left to the developer to fine-tune for their particular needs or preferences.

Figure 2:
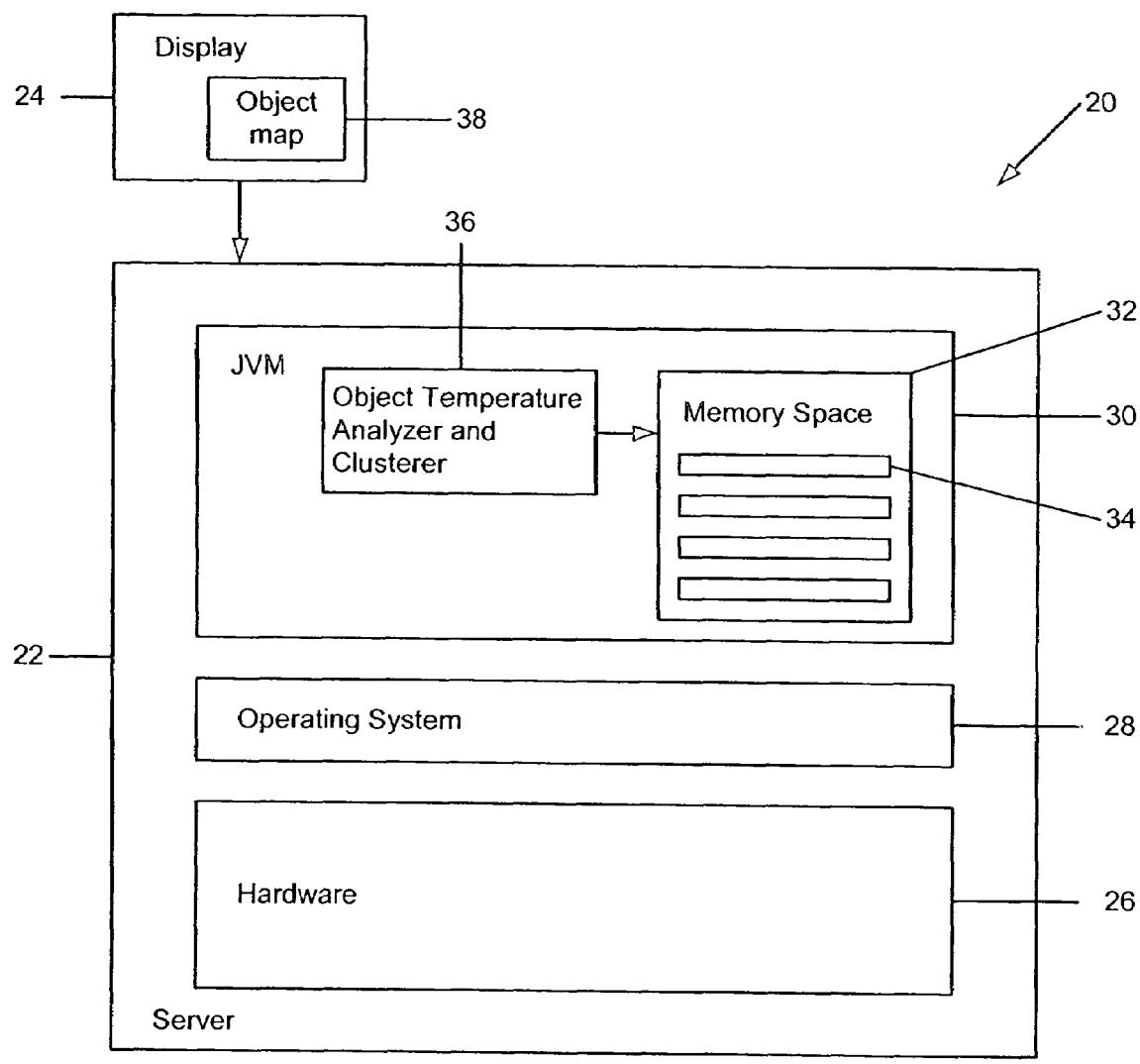
FIG. 2 illustrates a schematic of a system in accordance with an embodiment of the invention that can be used to analyze potential memory leaks.

FIG. 2 illustrates a system in accordance with an embodiment of the invention that can be used by a software developer to detect potential memory leaks in a virtual machine or run-time environment. As shown in FIG. 2, the system 20 typically includes a server 22 that is accessed by a client device including a display 24. In a typical development environment, the display 24 and server device 22 may be included within the same physical machine. As shown in the architecture, the server typically includes hardware components 26, operating system 28, and a run-time environment or virtual machine (VM) 30 such as the Java Virtual Machine, JRockit VM, or another type of virtual machine. The VM also includes, or has access to, a memory space 32 which includes the objects necessary for the application 34. In accordance with an embodiment of the invention, the VM includes a mechanism, in this case indicated as an object temperature analyzer and clusterer 36, which is used by the system to determine the temperature and potential memory leakage of objects 34 within memory space 32 of the VM 30. This information is then used to create an object map 38 on the developer's display 24, that illustrates the objects in memory and their potential for memory leakage.

Figure 3:
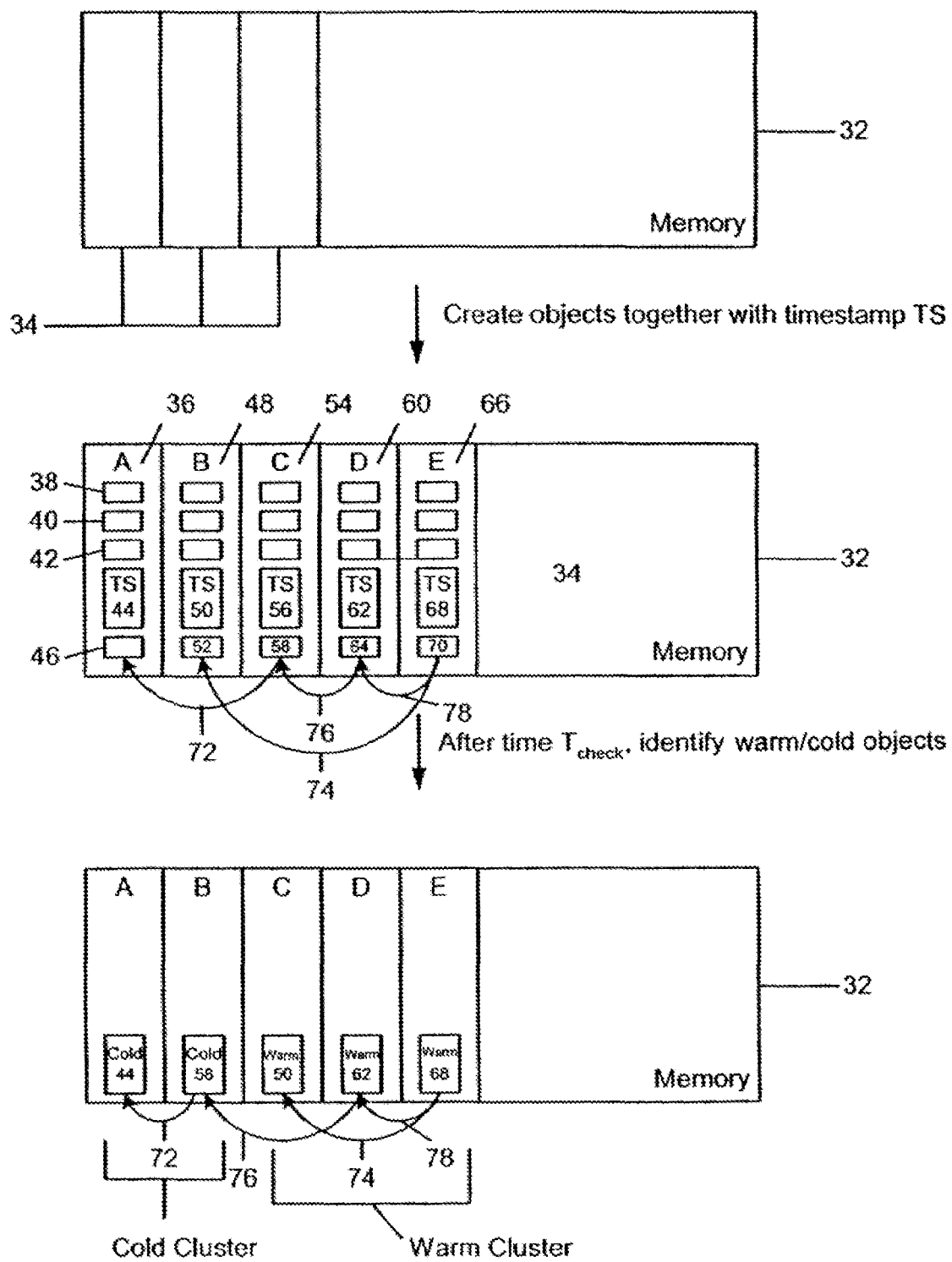
FIG. 3 illustrates a schematic of a process in accordance with an embodiment of the invention in which objects are marked as warm or cold objects and then clustered to provide memory leak information.

FIG. 3 illustrates an overview of a process in accordance with an embodiment of the invention in which objects in memory are clustered by the object temperature analyzer and clusterer to provide information about potential memory leaks to the developer. As shown in FIG. 3, objects 34 occupy the memory space 32 of the virtual machine. While in the example shown in FIG. 3, objects are actually moved within the memory space of the computer during a garbage collection process, it will be evident to one skilled in the art that the clustering process need not actually move the objects within memory but may merely determine which objects belong to which clusters and then use this information to create the object map that appears on the software developer's display. FIG. 3 is thus shown for illustrative purposes but does not necessarily represent the actual positioning or movement of objects within memory space.

As shown in FIG. 3, objects A 36, B 48, C 54, D 60, and E 66, are created in memory 32. Each object, for example object A 36, includes a number of fields 38, 40, 42. In accordance with an embodiment of the invention, the object will also include a time stamp 44 that is used to store a value indicating the time that the object was last accessed by the system or by another object. Pointer field 46 allows objects to reference other objects, or to be referenced by other objects. As shown in FIG. 3, as the objects are created they may reference other objects, for example in FIG. 3 object C references object A by pointer 72 while object D references object C by pointer 76. Similarly, pointers 70, 74, and 78 are used to reference other objects. After a particular time T has elapsed, which depending on the implementation may range from several milliseconds to many tens or hundreds of seconds, an analysis is performed of the objects currently in memory. The time stamp for each object is checked against the current system time, and those objects that have a time stamp older than a particular period of time are marked as cold objects. All other objects, i.e. those that have a time stamp more recent than a specified cut-off time are marked as warm objects. Once marked, cold objects are clustered together, as are warm objects. Links between warm clusters and cold clusters for example pointer 76 in FIG. 3, are particularly important since they represent a link from a warm object to a cold object and are thus a potential memory link. This information is provided to the software developer as part of the object map, and the fields responsible for this pointer will be indicated.

Figure 4:
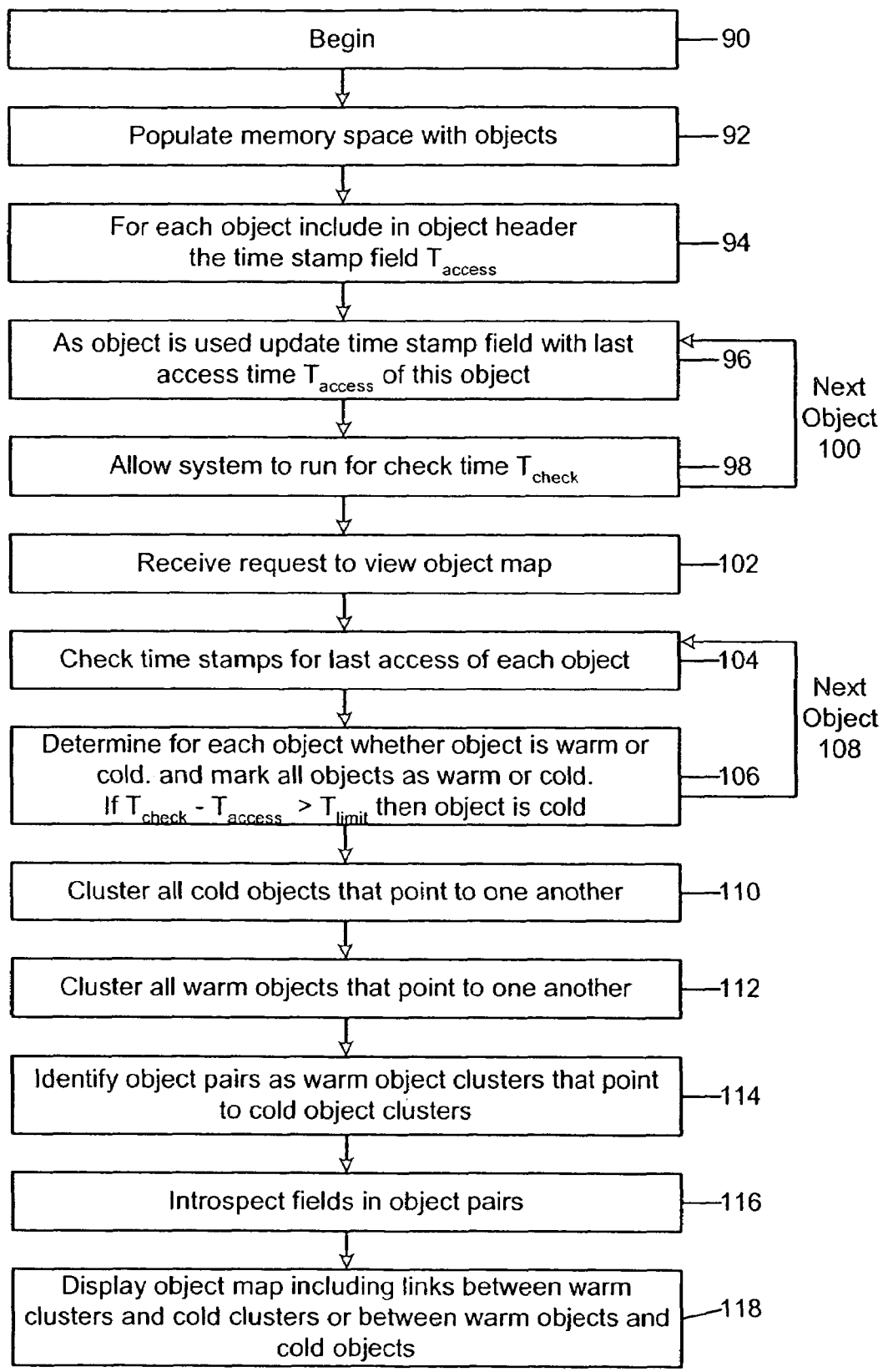
FIG. 4 shows a flowchart of a process in accordance with an embodiment of the invention that is used to cluster warm and cold objects and provide memory leak information.

FIG. 4 illustrates a flowchart in accordance with an embodiment of the invention that illustrates the process used by the system to display an object map, including displaying links between warm and cold clusters. As shown in FIG. 4, in step 90 the process begins, either automatically at a particular point in time, or at the request of the software developer, for example to take a snap-shot of the current state of the system. In step 92 the memory space is populated with objects as the run-time environment executes. For each object, in step 94, the object header includes a time stamp field which is initially set as $T_{init}$, i.e., the time at which the object is initialized. In step 96, as the object is used, or referenced by a subsequent object, the time stamp field is updated with the last access time $T_{access}$ for this particular object. The system is then allowed to run for a check time $T_{check}$, in step 98. This process is repeated in step 100 for each object in memory. In step 102, the system receives a request, i.e., either an automatic request or a determined request by the operator, to view the object display or object map. In step 104, the time stamp is checked for each object in memory. For each object in memory, in step 106 the state of the object is determined as to whether the object is warm or cold, and marked accordingly. If $T_{check}-T_{access}$ is greater than a specified time $T_{limit}$, then the object may be considered cold. This process is repeated for each object in memory, in step 108. Following the preceding steps all objects in memory will now be indicated as being warm or cold. In step 110, all cold objects that point to one another are clustered together, while in step 112 the clustering process is repeated for all warm objects. In step 114, the system determines these warm object clusters that point to cold object clusters. These are of particular importance to the software developer since they represent large potential memory leaks. In step 116, the fields in the culprit objects are introspected to determine which of the fields in the warm objects point to which of the fields in the cold objects. In step 118 the object map for the current situation is displayed on the user's display including links between the warm clusters and cold clusters, or between warm objects and cold objects. The information may also be exported to other applications for use during the software development process.

Figure 5:
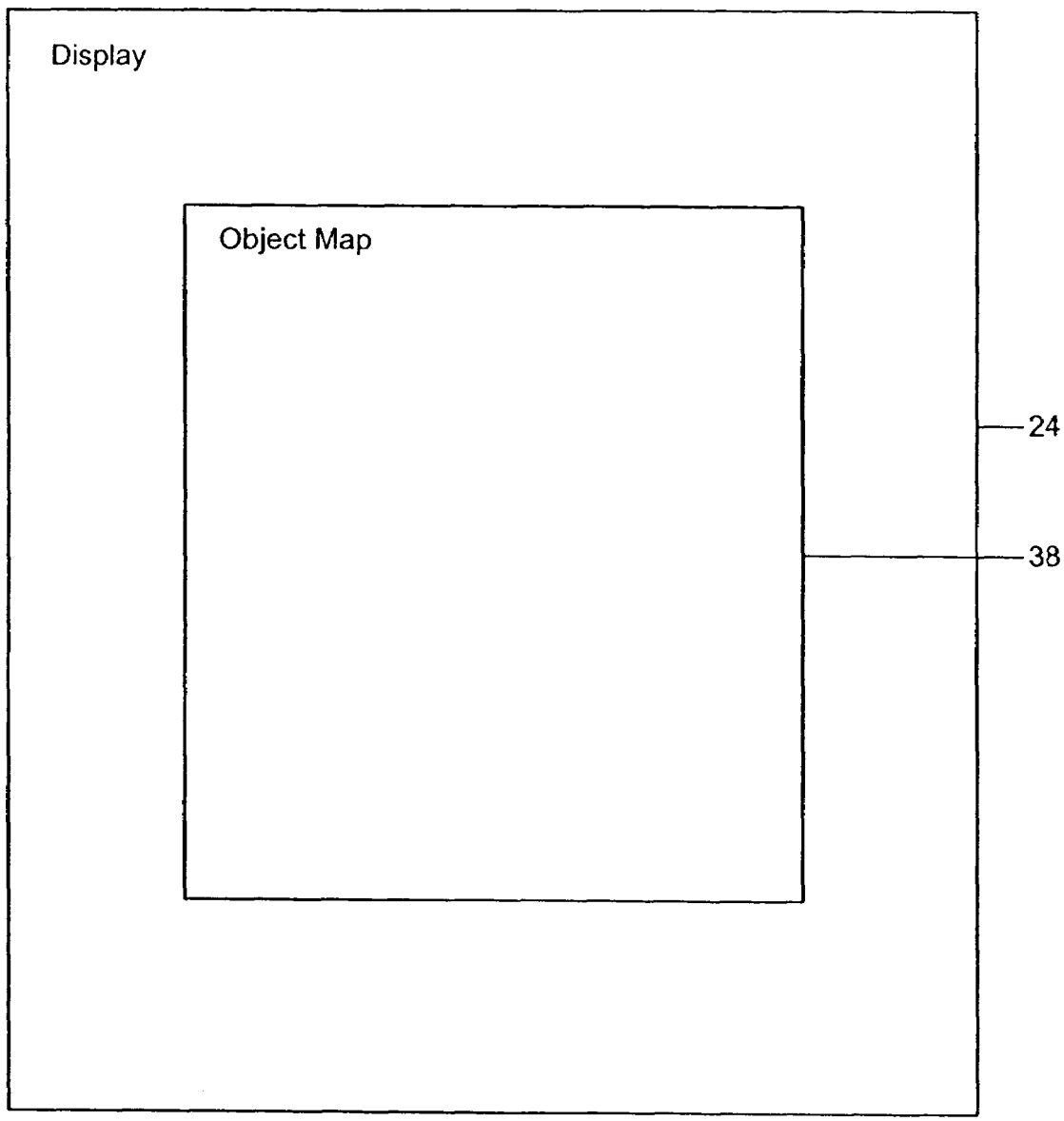
FIG. 5 illustrates a object map and display in accordance with an embodiment of the invention.

FIG. 5 illustrates an example of an object map in accordance with an embodiment of the invention. As shown in FIG. 5, the operator's display 24 is used to display an object map 38, upon which object clusters are displayed with those clusters that are warm and which point to cold clusters clearly indicated on the object map. The user may then find out additional information about the culprit objects modify the software code if necessary, and re-run the analysis to assist in the software development process.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMS, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the system and methods described above are described in the context of a WebLogic server, and a JRockit virtual machine, it will be evident that the system and methods may be used with other types of application servers, runtime systems, and virtual machines, including other types of JVMs. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for determining potential memory leaks in a runtime environment, said run-time environment including a virtual machine, the system comprising:

a memory for storing objects;

an object temperature analyzer that accepts as input from a system developer a value for a limiting time, wherein the object temperature analyzer determines for each object whether the object has persisted in the memory without being accessed or referenced for a length of time greater than the limiting time, wherein if the length of time is greater than the limiting time the object temperature analyzer sets the status of the object to cold, and if the length of time is less than the limiting time the object temperature analyzer sets the status of the object to warm; and wherein the object temperature analyzer determines links from any of the warm objects to any of the cold objects; and a report mechanism that reports information about the links, for use by the system developer in determining potential memory leaks.

2. The system of claim 1 further comprising:

an object clusterer for clustering groups of warm objects to form warm clusters, and groups of cold objects to form cold clusters.

3. The system of claim 2 wherein the links include any or both of warm object—cold object links and warm cluster—cold cluster links.

4. The system of claim 1 wherein the objects are used by the virtual machine.

5. The system of claim 1 wherein the links can be displayed on a computer screen device.

6. The system of claim 2 wherein the limiting time determining whether an object is warm or cold can be adjusted by the developer to better distinguish between warm and cold objects or warm and cold clusters.

7. The system of claim 1 wherein the objects are not moved in the memory when clustered.

8. A system for determining potential memory leaks in a runtime environment, said run-time environment including a virtual machine the system comprising:
- a memory for storing objects;
- means for accepting as input from a system developer a value for a limiting time;
- means for determining for each object whether the object has persisted in the memory without being accessed or referenced for a length of time greater than the limiting time, wherein if the length of time is greater than the limiting time, setting the status of the object to cold, and if the length of time is less than the limiting time, setting the status of the object to warm;
- means for determining links from any of the warm objects to any of the cold objects; and
- means for reporting information about the links for use by the system developer in determining potential memory leaks.

9. The system of claim 8 further comprising:
- means for clustering groups of warm objects to form warm clusters, and groups of cold objects to form cold clusters.

10. The system of claim 9 wherein the links include any or both of warm object—cold object links and warm cluster—cold cluster links.

11. The system of claim 8 wherein the objects are used by the virtual machine.

12. The system of claim 8 wherein the links can be displayed on a computer screen device.

13. The system of claim 9 wherein the limiting time determining whether an object is warm or cold can be adjusted by the developer to better distinguish between warm and cold objects or warm and cold clusters.

14. The system of claim 8 wherein the objects are not moved in the memory when clustered.

15. A method for determining potential memory leaks in a runtime environment, said run-time environment including a virtual machine and a memory for storing objects, the method comprising the steps of:
- accepting as input from a system developer a value for a limiting time;
- determining for each object whether the object has persisted in the memory without being accessed or referenced for a length of time greater than the limiting time, wherein if the length of time is greater than the limiting time, setting the status of the object to cold, and if the length of time is less than the limiting time, setting the status of the object to warm;
- determining links from any of the warm objects to any of the cold objects; and reporting information about the links for use by the system developer in determining potential memory leaks.

16. The method of claim 15 further comprising the step of:
- clustering groups of warm objects to form warm clusters, and groups of cold objects to form cold clusters.

17. The method of claim 16 wherein the links include any or both of warm object—cold object links and warm cluster—cold cluster links.

18. The method of claim 15 wherein the objects are used by the virtual machine.

19. The method of claim 15 wherein the links can be displayed on a computer screen device.

20. The method of claim 16 wherein the limiting time determining whether an object is warm or cold can be adjusted by the developer to better distinguish between warm and cold objects or warm and cold clusters.

21. The method of claim 15 wherein the objects are not moved in the memory when clustered.

22. A system for detecting memory leaks in an application server or run-time environment, the system comprising:
- a virtual machine executing within said run-time environment;
- a memory within said run-time environment for storing objects, for use by a software application; and
- a temperature analyzer that accepts as input from a system developer a value for a limiting time;
- wherein the temperature analyzer determines for each object whether the object has persisted in the memory without being accessed or referenced for a length of time greater than the limiting time, wherein if the length of time is greater than the limiting time, the object is marked as cold, and if the length of time is less than the limiting time, the object is marked as warm; and
- wherein the temperature analyzer determines links from any of the warm objects to any of the cold objects, for use by the system developer in detecting memory leaks.

23. The system of claim 22 further comprising:
- an object clusterer for clustering groups of warm objects to form warm clusters, and groups of cold objects to form cold clusters.

24. The system of claim 23 wherein the links include any or both of warm object—cold object links and warm cluster—cold cluster links.

25. The system of claim 22 wherein the objects are used by the virtual machine.

26. The system of claim 22 wherein the links can be displayed on a computer screen device.

27. The system of claim 23 wherein the limiting time determining whether an object is warm or cold can be adjusted by the developer to better distinguish between warm and cold objects or warm and cold clusters.

28. The system of claim 22 wherein the objects are not moved in the memory when clustered.

29. A system for detecting memory leaks in an application server or run-time environment, the system comprising:
- means for providing a virtual machine executing within said run-time environment;
- a memory for storing objects, said objects for use by a software application;
- means for accepting as input from a system developer a value for a limiting time:
- means for determining for each object whether the object has persisted in the memory without being accessed or referenced for a length of time greater than the limiting time, wherein if the length of time is greater than the limiting time, marking the object as cold, and if the length of time is less than the limiting time, marking the object as warm; and
- means for determining links from any of the warm objects to any of the cold objects, for use by the system developer in detecting memory leaks.

30. The system of claim 29 further comprising:
- means for clustering groups of warm objects to form warm clusters, and groups of cold objects to form cold clusters.

31. The system of claim 30 wherein the links include any or both of warm object—cold object links and warm cluster—cold cluster links.

32. The system of claim 29 wherein the objects are used by the virtual machine.

33. The system of claim 29 wherein the links can be displayed on a computer screen device.

34. The system of claim 30 wherein the limiting time determining whether an object is warm or cold can be adjusted by the developer to better distinguish between warm and cold objects or warm and cold clusters.

35. The system of claim 29 wherein the objects are not moved in the memory when clustered.

36. A method for detecting memory leaks in an application server or run-time environment, the method comprising the steps of:
providing a virtual machine executing within said run-time environment;
storing objects in a memory, for use by a software application;
accepting as input from a system developer a value for a limiting time:
determining for each object whether the object has persisted in the memory without being accessed or referenced for a length of time greater than the limiting time, wherein if the length of time is greater than the limiting time, marking the object as cold, and, if the length of time is less than the limiting time, marking the object as warm; and
determining links from any of the warm objects to any of the cold objects, for use by the system developer in detecting memory leaks.

37. The method of claim 36 further comprising the step of:
clustering groups of warm objects to form warm clusters, and groups of cold objects to form cold clusters.

38. The method of claim 37 wherein the links include any or both of warm object—cold object links and warm cluster—cold cluster links.

39. The method of claim 36 wherein the objects are used by the virtual machine.

40. The method of claim 36 wherein the links can be displayed on a computer screen device.

41. The method of claim 37 wherein the limiting time determining whether an object is warm or cold can be adjusted by the developer to better distinguish between warm and cold objects or warm and cold clusters.

42. The method of claim 36 wherein the objects are not moved in the memory when clustered.

43. A system for providing potential memory leak information in a run-time environment, the system comprising:
a memory for storing objects;
an object temperature analyzer that accepts as input from a system developer a value for a limiting time, wherein the object temperature analyzer determines for each object whether the object has persisted in the memory without being accessed or referenced for a length of time greater than the limiting time, wherein if the length of time is greater than the limiting time the object temperature analyzer marks the object as cold, and if the length of time is less than the limiting time the object temperature analyzer marks the object as warm;
an object clusterer that clusters groups of warm objects to form warm clusters and groups of cold objects to form cold clusters; and
an object map that identifies links from any of the warm objects in any of the warm clusters to any of the cold objects in any of the cold clusters to assist the system developer in determining potential memory leaks.

44. The system of claim 43 wherein the links include any or both of warm object—cold object links and warm cluster—cold cluster links.

45. The system of claim 43 wherein the objects are used by the virtual machine.

46. The system of claim 43 wherein the links can be displayed on a computer screen device.

47. The system of claim 43 wherein the limiting time determining whether an object is warm or cold can be adjusted by the developer to better distinguish between warm and cold objects or warm and cold clusters.

48. The system of claim 43 wherein the objects are not moved in the memory when clustered.

49. A system for providing potential memory leak information in a run-time environment, the system comprising:
a memory for storing objects;
means for accepting as input from a system developer a value for a limiting time;
means for determining for each object whether the object has persisted in the memory without being accessed or referenced for a length of time greater than the limiting time, wherein if the length of time is greater than the limiting time the object temperature analyzer marks the object as cold, and if the length of time is less than the limiting time the object temperature analyzer marks the object as warm;
means for clustering groups of warm objects to form warm clusters and groups of cold objects to form cold clusters; and
means for identifying links from any of the warm objects in any of the warm clusters to any of the cold objects in any of the cold clusters to assist the system developer in determining potential memory leaks.

50. The system of claim 49 wherein the links include any or both of warm object—cold object links and warm cluster—cold cluster links.

51. The system of claim 49 wherein the objects are used by the virtual machine.

52. The system of claim 49 wherein the links can be displayed on a computer screen device.

53. The system of claim 49 wherein the limiting time determining whether an object is warm or cold can be adjusted by the developer to better distinguish between warm and cold objects or warm and cold clusters.

54. The system of claim 49 wherein the objects are not moved in the memory when clustered.

55. A method for providing potential memory leak information in a run-time environment, the method comprising the steps of:
storing objects in a memory;
accepting as input from a system developer a value for a limiting time;
determining for each object whether the object has persisted in the memory without being accessed or referenced for a length of time greater than the limiting time, wherein if the length of time is greater than the limiting time the object temperature analyzer marks the object as cold, and if the length of time is less than the limiting time the object temperature analyzer marks the object as warm;
clustering groups of warm objects to form warm clusters and groups of cold objects to form cold clusters; and
identifying links from any of the warm objects in any of the warm dusters to any of the cold objects in any of the cold clusters to assist the system developer in determining potential memory leaks.

56. The method of claim 55 wherein the links include any or both of warm object—cold object links and warm cluster—cold cluster links.

57. The method of claim 55 wherein the objects are used by the virtual machine.

58. The method of claim 55 wherein the links can be displayed on a computer screen device.

59. The method of claim 55 wherein the limiting time determining whether an object is warm or cold can be adjusted by the developer to better distinguish between warm and cold objects or warm and cold clusters.

60. The method of claim 55 wherein the objects are not moved in the memory when clustered.

61. A system for use in determining potential memory leaks in a run-time environment, said run-time environment including a virtual machine, the system comprising:
   a memory for storing objects;
   objects located in the memory, wherein each object includes a time stamp field and a time stamp therein, and wherein the time stamp is updated with a current system time $T_{access}$ when the object is accessed or referenced;
   an object temperature analyzer that accepts as input from a system developer a value for a limiting time $T_{limit}$, wherein the object temperature analyzer after a time $T_{check}$, marks each object as warm if the length of time between $T_{access}$ and $T_{check}$ is less than the limiting time $T_{limit}$ or marks the object as cold if the length of time between $T_{access}$ and $T_{check}$ is greater than the limiting time $T_{limit}$;
   an object clusterer that clusters groups warm objects to form warm clusters and groups cold objects to form cold clusters; and
   a display device that displays an object map, the object map including links from any of the warm objects in any of the warm clusters to any of the cold objects in any of the cold clusters.

62. The system of claim 61 wherein the links include any or both of warm object—cold object links and warm cluster—cold cluster links.

63. The system of claim 61 wherein the objects are used by the virtual machine.

64. The system of claim 61 wherein the limiting time determining whether an object is warm or cold can be adjusted by the developer to better distinguish between warm and cold objects or warm and cold clusters.

65. The system of claim 61 wherein the objects are not moved in the memory when clustered.

66. A system for use in determining potential memory leaks in a run-time environment, said run-time environment including a virtual machine, the system comprising:
   means for creating objects in a memory of the run-time environment;
   means for stamping each object with a time stamp $T_{init}$ when created;
   means for updating the time stamp of each object with a current system time $T_{access}$ when the object is accessed or referenced;
   means for accepting as input by a system developer a value for a limiting time $T_{limit}$;
   means for after a time $T_{check}$, marking each object as warm if the length of time between $T_{access}$ and $T_{check}$ is less than the limiting time $T_{limit}$ or marking the object as cold if the length of time between $T_{access}$ and $T_{check}$ is greater than the limiting time $T_{limit}$;
   means for clustering groups of warm objects to form warm clusters and groups of cold objects to form cold clusters; and
   means for displaying an object map showing links from any of the warm objects in any of the warm clusters to any of the cold objects in any of the cold clusters.

67. The system of claim 66 wherein the links include any or both of warm object—cold object links and warm cluster—cold cluster links.

68. The system of claim 66 wherein the objects are used by the virtual machine.

69. The system of claim 66 wherein the limiting time determining whether an object is warm or cold can be adjusted by the developer to better distinguish between warm and cold objects or warm and cold clusters.

70. The system of claim 66 wherein the objects are not moved in the memory when clustered.

71. A method for use in determining potential memory leaks in a run-time environment, said run-time environment including a virtual machine, the method comprising:
   creating objects in a memory of the run-time environment; stamping each object with a time stamp $T_{init}$ when created;
   updating the time stamp of each object with a current system time $T_{access}$ when the object is accessed or referenced;
   accepting as input by a system developer a value for a limiting time $T_{limit}$;
   after a time $T_{check}$, marking each object as warm if the length of time between $T_{access}$ and $T_{check}$ is less than the limiting time $T_{limit}$ or marking the object as cold if the length of time between $T_{access}$ and $T_{check}$ is greater than the limiting time $T_{limit}$;
   clustering groups of warm objects to form warm clusters and groups of cold objects to form cold clusters; and
   displaying an object map showing links from any of the warm objects in any of the warm clusters to any of the cold objects in any of the cold clusters.

72. The method of claim 71 wherein the links include any or both of warm object—cold object links and warm cluster—cold cluster links.

73. The method of claim 71 wherein the objects are used by the virtual machine.

74. The method of claim 71 wherein the limiting time determining whether an object is warm or cold can be adjusted by the developer to better distinguish between warm and cold objects or warm and cold clusters.

75. The method of claim 71 wherein the objects are not moved in the memory when clustered.

* * * * *

UNITED STATES PATENT AND TRADEMARK OFFICE
CERTIFICATE OF CORRECTION

| | | |
|---|---|---|
| PATENT NO. | : 7,293,263 B2 | Page 1 of 1 |
| APPLICATION NO. | : 10/737404 | |
| DATED | : November 6, 2007 | |
| INVENTOR(S) | : Dahlstedt et al. | |

It is certified that error appears in the above-identified patent and that said Letters Patent is hereby corrected as shown below:

On Sheet 4 of 5, in Figure 4, Ref. Numeral 106, line 2, after "cold" delete ".".

In column 1, line 66, after "display" insert -- or --.

In column 3, line 11, delete "a" and insert -- an --, therefor.

In column 3, line 61, after "programmer" insert -- or --.

In column 6, line 4, delete "EEPROMS," and insert -- EEPROMs, --, therefor.

In column 7, line 3, in claim 8, after "machine" insert -- , --.

In column 9, line 22, in claim 36, after "and" delete ",".

In column 10, line 62, in claim 55, delete "dusters" and insert -- clusters --, therefor.

Signed and Sealed this

Sixteenth Day of March, 2010

David J. Kappos
*Director of the United States Patent and Trademark Office*